F. B. SULLIVAN.
AUTOMOBILE BODY AND WATER BAG PROTECTOR.
APPLICATION FILED OCT. 22, 1915.
1,175,837.
Patented Mar. 14, 1916.
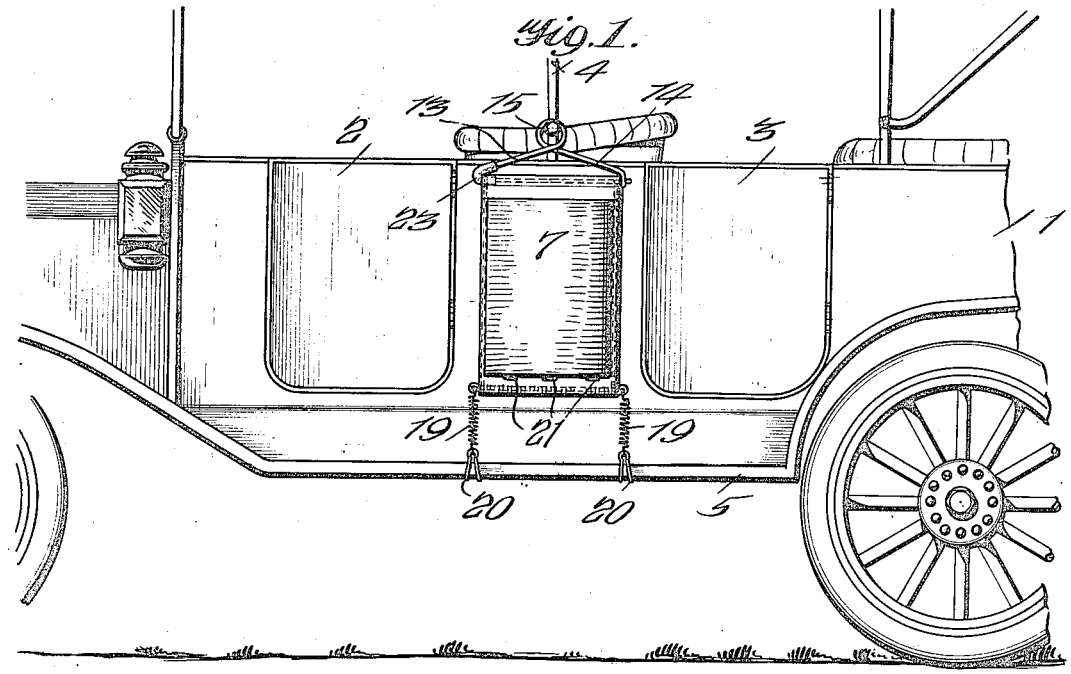
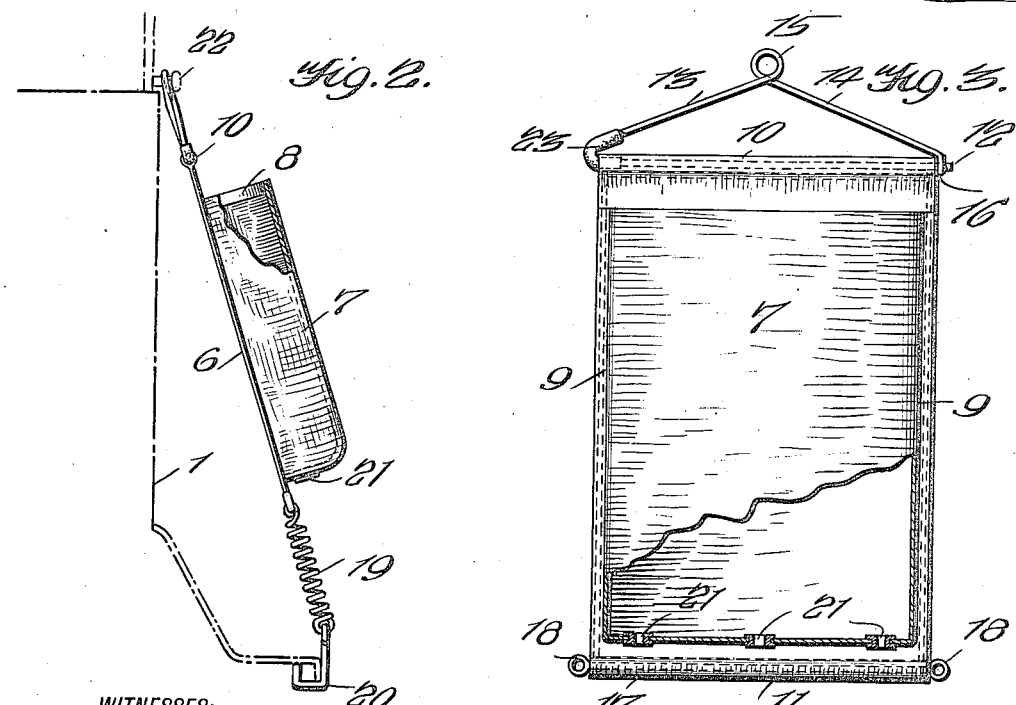
WITNESSES:
INVENTOR
FRED B. SULLIVAN,
BY Munn & Co.
ATTORNEYS

UNITED STATES PATENT OFFICE.

FRED B. SULLIVAN, OF CARSON CITY, NEVADA.

AUTOMOBILE-BODY AND WATER-BAG PROTECTOR.

1,175,837.  Specification of Letters Patent. Patented Mar. 14, 1916.

Application filed October 22, 1915. Serial No. 57,345.

*To all whom it may concern:*

Be it known that I, FRED B. SULLIVAN, a citizen of the United States, and a resident of Carson City, in the county of Ormsby and State of Nevada, have invented a new and useful Improvement in Automobile-Body and Water-Bag Protectors, of which the following is a specification.

My invention is an improvement in automobile body and water bag protectors, and the invention has for its object to provide a simply constructed inexpensive device of the character specified for use with automobiles and other motor vehicles, and comprising a bag of flexible material, as for instance, canvas or the like, having means for connecting the same with the body of a vehicle to support the bag in inclined position between the fore and rear doors, in such manner that the bag will not mar or injure the body, and will be yieldingly supported to prevent injury to its contents.

In the drawings: Figure 1 is a side view of an automobile provided with the improvement, Fig. 2 is a side view of the bag in place, and Fig. 3 is an enlarged front view of the bag.

The present embodiment of the invention is shown in connection with an automobile 1, the bag being arranged between the fore and rear doors 2 and 3, and being connected to the top 4 and the foot or running board 5.

The improvement comprises a sheet 6 of suitable material, as for instance, heavy cloth or canvas having upon one face thereof a pocket 7 of the same material, the said pocket being open at its top and preferably the top is reinforced as shown at 8. The pocket is of slightly less width than the sheet and of slightly less length, and the side edges of the sheet are reinforced as indicated at 9 by doubling them back upon the body and stitching them in place as shown. Tubular portions 10 and 11 are formed at the top and bottom of the sheet respectively, by folding the material of the sheet over upon itself and securing it to the body by stitching or the like, and the body 12 of a bail is passed through the tubular portion 10. This bail is formed from wire or the like bent to form the body, and a pair of diverging arms 13 and 14, connected by an eye 15. The arm 13 is integral with one end of the body and the eye 15 and the arm 14 are integral and continuous with the arm 13. The free end of the arm 14 is provided with an angular eye or loop 16, which engages the free end of the body 12, and the bail is thus completed.

A rod 17 is passed through the lower tubular portion 11, and this rod has eyes 18 at its ends. The eyes 18 limit the longitudinal movement of the rod in the tubular portion, and a coil spring 19 is connected with each eye at one end of the spring. Each of the springs is provided at its lower end with a double hook 20, the said hook being formed from a single piece of wire bent upon itself to form an eye for engaging a hook at the lower end of the adjacent spring, and the ends of the wire are bent to form the hook. Preferably the pocket 7 is provided in its bottom with openings, three in number in the present instance, and each opening is reinforced by an eyelet 21 of the usual construction.

The improved protector is arranged as shown in Fig. 1, the eye 15 engaging or hooking over the bracket 22, which supports the top of the automobile, and that bracket which is before the fore and rear doors. The hooks 20 are engaged with the foot board 5, hooking over the outer edges of the foot board as shown in Figs. 1 and 2. Thus the bag is supported in inclined position, inclining downwardly and outwardly, and yielding so that the bag will not strike the body of the automob'le and the contents of the bag will also be protected.

Preferably a guard 23 in the form of a rubber sleeve is fitted over the angle connecting the body 12 of the bail with the arm 13, which is to protect the fore door of the automobile, when in an open position. A similar guard is also to be fitted over the free end of the arm 14 covering over the angular eye or loop 16, whenever the same is desired, this being to protect the rear door of the automobile on vehicles that have this door attached so that it swings to the front when in an open position. The particular arrangement of supporting the protector holds it away from the body or bed of the automobile at an angle which will be governed by the width of the foot board of the vehicle.

The improvement may be attached to automobiles carrying the so-called "one-man top" by means of a hook or an arm extending from the wire shield or dash of the automobile.

The water bag may be arranged in the pocket where it is readily accessible and from which it may be easily removed or into which it may be easily inserted. Should there be leakage it will be discharged through the eyelets 21 away from the body of the automobile.

The improved protector prevents the water bag from swinging free, and from marring the body of the vehicle, and in addition it protects the water bag from a large amount of wear. When not used for holding the water bag the improvement provides a convenient and easily accessible place for the carrying of small articles and packages.

It will be understood that in practice the improved protector may be made with a covering flap for the pocket, the said flap being of the same material, and fastened to the sheet above the top of the pocket just below the bail by stitching or in any other suitable or desired manner, and folding down outside of the pocket where it will be fastened with a buckle, snap fastener, or the like.

I claim:—

1. A device of the character specified, comprising a sheet of fabric material having integral tubular portions at its ends, a bail comprising a body engaging the tubular portion at the upper end of the sheet and arms extending inwardly from the ends of the body and connected by an eye, a rod extending through the tubular portion at the lower end and provided with eyes at its ends, said sheet having a pocket on one face of fabric material, a coil spring engaging each eye of the rod at one end of the spring and provided at the other end with a double hook for engaging the foot board of a motor vehicle, the eye of the bail being adapted to engage the bracket of the vehicle top, and a fender of elastic material at the end of the bail, the pocket being open at its top and having eyeleted drainage openings at its bottom.

2. A device of the character specified, comprising a sheet of fabric material having integral tubular portions at its ends, a bail comprising a body engaging the tubular portion at the upper end of the sheet and arms extending inwardly from the ends of the body and connected by an eye, a rod extending through the tubular portion at the lower end and provided with eyes at its ends, said sheet having a pocket on one face of fabric material, a coil spring at each end of the rod, each spring having one end engaged with the adjacent eye and the other provided with a double hook for engaging the foot board of a motor vehicle, the eye of the bail being adapted to engage the bracket of the vehicle top.

3. A device of the character specified, comprising a sheet of flexible material having at one end a bail and at the other a transverse rod, a coil spring depending from each end of the rod, each spring having a hook at its lower end and a pocket opening at the top on one face of the sheet.

FRED B. SULLIVAN.

Witnesses:
 THOMAS A. LOTZ,
 C. H. PETERS.